INVENTOR
Isaac Harter & Charles L. Norton Jr.
BY
J.P.Moran
ATTORNEY

April 28, 1953
I. HARTER ET AL
2,636,723
HIGH-TEMPERATURE MELTING APPARATUS
Original Filed July 19, 1946
3 Sheets-Sheet 2
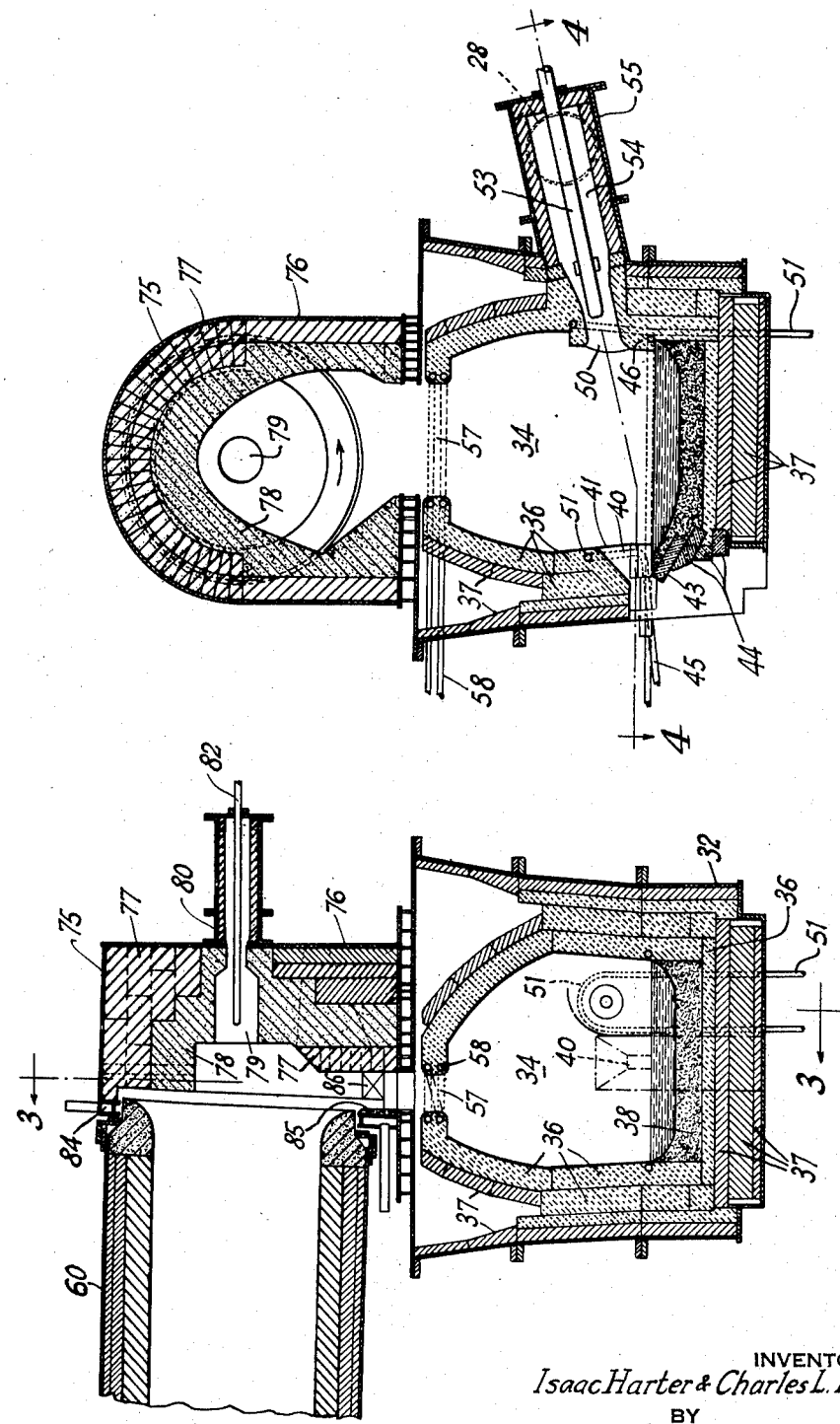
INVENTORS
Isaac Harter & Charles L. Norton, Jr.
BY
J. P. Moran
ATTORNEY April 28, 1953     I. HARTER ET AL     2,636,723
HIGH-TEMPERATURE MELTING APPARATUS Original Filed July 19, 1946             3 Sheets-Sheet 3

INVENTORS
Isaac Harter & Charles L. Norton, Jr.
BY
ATTORNEY

Patented Apr. 28, 1953

2,636,723

UNITED STATES PATENT OFFICE 2,636,723

HIGH-TEMPERATURE MELTING APPARATUS

Isaac Harter, Beaver, Pa., and Charles L. Norton, Jr., New York, N. Y., assignors to The Babcock & Wilcox Company, Rockleigh, N. J., a corporation of New Jersey Original application July 19, 1946, Serial No. 684,686. Divided and this application January 29, 1949, Serial No. 73,644

7 Claims. (Cl. 263—36)

The present invention relates to apparatus for continuously obtaining high combustion temperatures under conditions suitable for the melting of materials and other purposes, and is especially designed and particularly adapted for the continuous melting of ceramic refractory materials having a high fusion temperature, such as, for example, fireclays, kaolins, bauxite, kyanite, etc., all of which have a fusion temperature above 2900° F., and utilization of the melted product for the manufacture of improved refractory fiber, cast fused refractories, grog, and the like.

Materials having melting temperatures above 2900° F. have been heretofore melted commercially in electric furnaces, but in view of the high initial investment, the relatively low efficiency, and high operating charges, such apparatus is not commercially practicable for melting large quantities of material for use in relatively low cost products. Furthermore, the atmosphere in the melting zone of an electric arc melting furnace is inherently reducing, preventing the use of such apparatus for the melting of any materials for which a neutral or oxidizing atmosphere is required or desirable in the melting zone.

Some refractory materials, such as those widely used commercially for the manufacture of glass or slag wool, for example, can be readily melted in a cupola by mixing and burning coke therewith due to the relatively low fusion temperature of such materials usually in the range of 1500–2500° F. Where the raw material has a fusion temperature in the higher portion of this range, it is customary to add varying amounts of a flux, such as limestone, dolomite, fluorspar, or feldspar, to lower the fusion point of the resulting mixture to the desired value. Continuous operation over long operating periods and with substantial rates of melt production can be readily attained under such conditions. The molten mass flows out of the cupola at a temperature usually in the range of 2100–2600° F. in a stream which can be extenuated to fiber by various methods, such as blasting the stream with high velocity air or steam to shred the molten material into fibers of various lengths. The cupola product can be controlled to some extent by varying the rock-coke ratio of the charge, but this involves a lag of several hours before becoming effective.

One of the principal uses of mineral wool of the character described is for heat insulation. The upper use temperature limit for such material is determined by the temperature at which recrystallization occurs therein to an extent that embrittlement and loss of strength in the fibers result. At this temperature, known as the "devitrification" temperature, the material changes from a glassy to a crystalline structure. Tests of the best known commercial brands of mineral wool now on the market have shown none in satisfactory condition after a twenty-four hour exposure at 1350° F. due to excessive recrystallization at that temperature. The manufacturers' recommended upper use temperature limits for these mineral wools are therefore confined to the range of 900–1200° F.

The general object of this invention is the provision of apparatus for continuously melting high temperature materials, and more particularly alumina-silica refractory materials, such as fireclays, kaolins, bauxite, kyanite, sillimanite and topaz, having a fusion point in the range 2900–3350° F. A further object is the provision of apparatus for melting materials of the character described which permits rapid and effective control of the temperature, viscosity and chemical composition of the chemical composition of the melted product. A further object is the provision of a melting furnace for continuously maintaining flame temperatures therein by the combustion of a relatively low cost fluid fuel in the temperature range for which electrically heated furnaces have heretofore been employed. A further specific object is the provision of apparatus for continuously charging ceramic refractory materials having a melting temperature in excess of 2900° F., melting the same under substantially uniform melting conditions, either oxidizing or reducing, and substantially continuously discharging the melted or fused materials. A further specific object is the provision of apparatus for continuously manufacturing a mineral wool having a permissible maximum use temperature above 2000° F., a very low alkali content, high flexibility and strength, low thermal conductivity, and high resistance to water vapor attack at high temperatures. A further specific object is the provision of apparatus for manufacturing grog and cast fused refractory shapes having a high hot load resistance and improved volume stability over a wide range of temperatures. A further specific object is the provision of apparatus for manufacturing high temperature grog from raw ceramic refractory materials, such as domestic kyanite ore, ordinarily having a grain size much too small for grog manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of our invention.

Of the drawings:

Fig. 2 is an enlarged vertical section of the melting pot and a portion of the rotary diagrammatically shown in Fig. 1;

Fig. 3 is a vertical section of the apparatus shown in Fig. 2 taken on the line 3—3 of Figs. 2 and 4;

Air heaters for preheating the air for combustion are usually incorporated in the exhaust gas path of most large fuel consuming units, such as a steam boiler, to improve the overall thermal efficiency of the unit by returning the heat recovered in this manner to the combustion chamber. It has usually been recognized that such preheating of the combustion air will also result in an increase in combustion chamber temperatures. The flame temperature increase, however, is relatively small, as the maximum air temperature usually obtainable is of the order of 400–600° F. Metallic tube or plate air heaters are limited in any event by the temperature-pressure limitation of the metals used in their construction and even with high heat resistant alloy metals, air heaters seldom deliver air at temperatures above 1200° F. Higher air temperatures are obtainable with air heater tubes formed of refractory materials, such as silicon carbide or aluminum oxide, but it is difficult to maintain gas tight conditions in such apparatus even with moderate pressures. High temperature air preheating is obtainable however with regenerative type air preheaters in which heating gases and air are passed over a relatively stationary refractory heat exchange surface in alternate cycles. The disadvantages of such apparatus are its bulk, substantial fluctuations in air outlet temperatures, the necessity of having reversing valves in high temperature locations, and inherent leakage problems.

Figure 1:
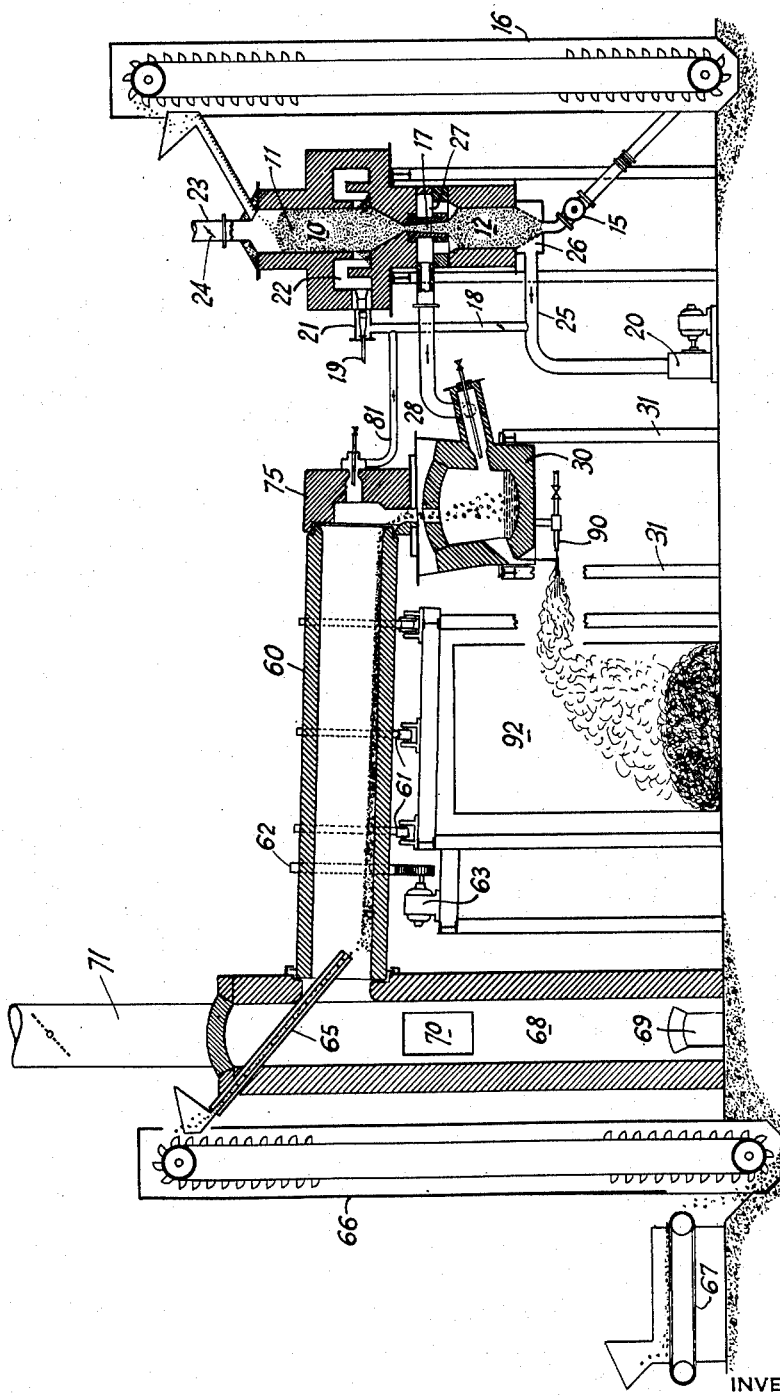
Fig. 1 is a somewhat diagrammatic illustration of a preferred form of the apparatus as used in making mineral wool.

In accordance with our invention, uniform flame temperatures substantially above 3000° F. can be continuously maintained by a special construction of a melting furnace and the burning of a low-cost fluid fuel therein in the presence of the desired amount of combustion air at a regulable uniform high temperature. The source of high temperature preheated air is preferably a fluid heating unit of the type disclosed in Bailey et al. U. S. Patent No. 2,447,306, and, as disclosed therein and illustrated in Fig. 1 hereof, comprises a high temperature refractory-lined gas-tight casing enclosing an upper heating chamber 10 normally partly filled with a fluent gas-pervious mass of refractory heat transfer material 11 adapted to be heated by high temperature gases while passing therethrough, a connected subjacent heat absorbing or fluid heating chamber 12 arranged to receive, and normally substantially completely filled with, a fluent mass of heated refractory material from the upper chamber which is utilized for heating the air to be used for combustion purposes in the associated melting furnace, to a predetermined temperature. A regulable pocket feeder 15 and an elevator 16 receive the cooled refractory material from the lower chamber 12 and return it to the upper part of the upper chamber. A regulable control system is used for regulating operating pressure conditions in the upper and lower chambers. The upper and lower chambers are connected by a vertically elongated structurally unobstructed throat 17 of reduced diameter normally filled with the refractory heat transfer material.

The refractory heat transfer material is preferably in the form of spherical pellets or "pebbles," between one-quarter and one-half inch in diameter, and formed of a fired composition hard enough to withstand abrasion and highly resistant to thermal shock and impact stresses. The pebble composition must be sufficiently refractory so that no softening or incipient fusion will occur in the upper chamber, causing them to cluster and cause "bridging" of the moving bed. Kaolin, mullite and 85% alumina have all been successfully used as the basic constituent of the pebble composition. The pebbles are made by extruding a refractory mix in a plastic condition, cutting and forming the extruded material into spheres, and drying and firing the spheres. An average pebble cycle through the unit requires 30–50 minutes and can be varied by regulating the feeder and elevator speeds to thereby control the temperature of the fluid being heated.

The pebble mass in the upper chamber is heated by supplying a fluid fuel from a fuel supply pipe 19 and combustion air from a blower 20 and valve controlled pipe 18 to one or more burners 21 opening tangentially into an annular combustion chamber 22 surrounding and discharging heating gases into the lower part of the upper chamber. The heating gases flow upwardly through the pebble mass to a stack connection 23 in which is positioned a control damper 24. A second valve controlled air supply pipe 25 connected to the blower 20 supplies air under a positive pressure to an air inlet chamber 26 surrounding the lower end of the lower chamber, from which it flows upwardly through the high temperature pebble mass therein to a preheated air outlet chamber 27 surrounding the throat 17. A valve controlled refractory lined air discharge pipe 28 conducts the high temperature air to the melting furnace or pot 30 hereinafter described. As disclosed in said patent, suitable controls are provided for insuring a continuous supply of air at a predetermined high temperature and at a positive pressure to the pipe 28.

Typical operating data with an air heating unit of the character described is:

Air inlet temp. °F _____ 100
Air outlet temp. °F _____ 2180
Weight air heated, lb./hr _____ 1800
B. t. u./hr. in fuel supplied _____ 1,760,000
Weight flue gas, lb./hr _____ 2240
Pebble circulation, lb./hr _____ 2150
Flue gas exit temp. °F _____ 750

Figure 5:
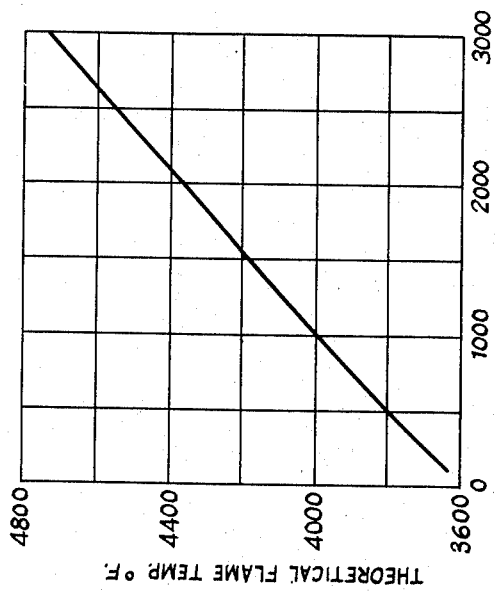
Fig. 5 is a chart showing the theoretical relation between preheated combustion air and flame temperatures for No. 2 fuel oil with 100% total air.
Figure 6:
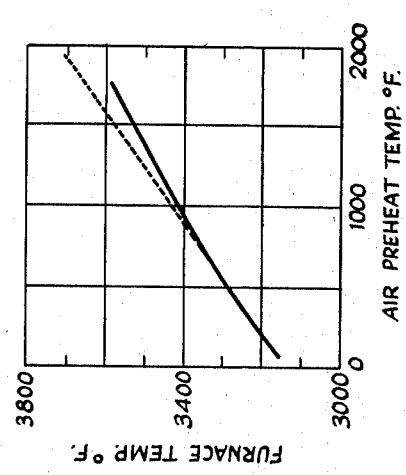
Fig. 6 is a chart showing actual furnace temperatures with various degrees of air preheating.

The capacity of an air heating unit of the character described to continuously deliver large quantities of preheated air at a uniform rate and high temperature permits the maintenance of a uniform high flame temperature within an associated combustion chamber. In Fig. 5 we have shown the theoretical flame temperatures which are obtainable with No. 2 fuel oil and 100% combustion air with the air preheated to different temperatures. This chart is based on involved computations including corrections for the lowering of the flame temperature due to dissociation of combustion products. Fig. 6 shows a curve of recorded temperatures obtained in an oil-fired refractory furnace of the character hereinafter described when using combustion air preheated to several different temperatures. The upper portion of this curve is dotted to indicate that equilibrium had not been established, as it was necessary on that test run to shut the furnace down on a rising temperature gradient to avoid failure of the furnace roof which was made of alumina refractory. The resulting furnace temperature with 1800° F. preheated air, for example, approximating 3600° F., is adequate to readily melt fireclays, kaolins, kyanite, mullite, bauxite and many other materials, and approximates the required melting temperature for alumina (3722° F.).

Figure 4:
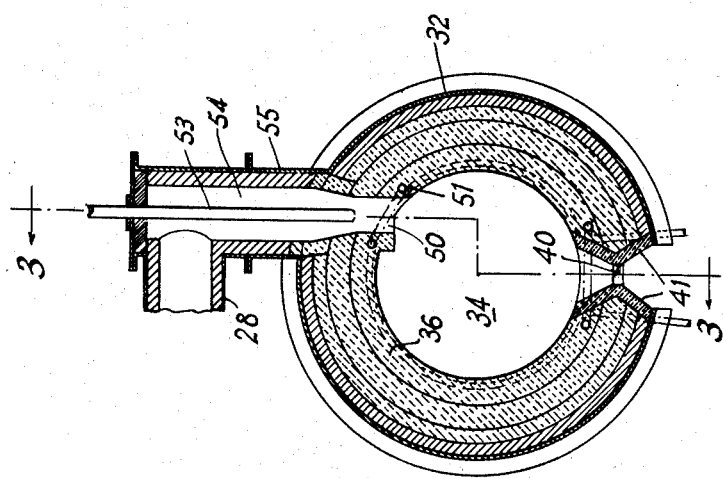
Fig. 4 is a plan section taken on the line 4—4 of Fig. 3.

The melting furnace or pot 30 is carried on suitable supports 31, and as shown in Figs. 2–4, consists of a sectional steel outside casing 32 of circular horizontal cross-section enclosing a melting chamber 34 of substantially circular horizontal cross-section which is defined by thick walls of high temperature refractory material, portions of which are water cooled for maintenance purposes. The pot construction shown is particularly designed for the melting of kaolins, and for that purpose the inner exposed walls are formed mainly of alumina blocks 36 covered on their outer sides by blocks of insulating firebrick 37 which have a service temperature up to 3000° F. The exposed bottom surface is formed by a concavely shaped block of rammed kaolin 38 below which is a layer of alumina blocks 34 supported on several layers of high temperature insulating firebrick 37. A melt outlet 40 of vertically elongated rectangular cross-section is defined by a pair of reversely tapering molded side blocks 41 of chromium oxide with the bottom or pouring edge defined by a block of silicon carbide 43 over which the molten material flows. Blocks 44 of zircon are arranged to support the block 43 in an inclined position. A water cooling pipe 45 having suitable supply and discharge connections is embedded in the refractory material defining the sides of the melt opening 40, while a water cooling studded pipe 46 is embedded in the refractory along three sides of the melting pot at the pouring level. As shown in Fig. 4, the melt outlet 40 is symmetrically located along the melting pot center line.

At the opposite side of the melting chamber and substantially offset from the center line thereof and similarly from the melt outlet 40, is located a burner port opening 50 defined by alumina refractory and cooled by a U-shaped water tube 51 embedded in the refractory adjacent the lower or discharge end of the inclined burner port. A water cooled fuel burner barrel 53 extends into the burner port 50 with its major portion however located in an air chamber 54 defined by a refractory lined burner casing 55, through the outer end of which the fuel burner barrel projects. The refractory lined air discharge pipe 28 communicates with one side of the burner casing 55 providing communication with the air preheating unit.

An opening 57 is located in the top of the melting chamber for the introduction of the material to be heated, and the discharge therethrough of the gaseous products of combustion from the melting chamber. As shown in Figs. 2 and 3, the opening 57 is of rectangular cross-section, with its major axis parallel to and at the opposite side of the chamber center line from the burner nozzle axis. The opening 57 is water cooled by a water pipe 58 surrounding the same on all sides and with its inner face covered by plastic chrome ore refractory.

With the construction described the material to be melted is supplied in a predetermined condition through the supply opening 57 and falls onto the hearth section 38. With the air preheater in operation as described, high temperature air and fuel are discharged through the burner port 50 in a predetermined air/fuel ratio to give the most efficient combustion conditions and the desired melting atmosphere. The burning fuel stream sweeps around the melting chamber at the level of the melt discharge opening 40, and upwardly in a converging spiral path to the opening 57 through which the gaseous products of combustion are discharged in contact with the entering material to be heated. The described relative arrangement of the fuel burner port 50, melt outlet 40 and gas outlet 57 provides a length of flame travel insuring the desired high melting temperature in the pot, prevention of accumulations at the melt outlet, and substantially complete combustion of the fuel within the melting pot.

It is desirable that the material to be melted be delivered to the melting chamber in a suitable preheated condition, and for this purpose a rotary kiln 60 is operatively associated with the melting pot 30. The kiln 60 is of a well known refractory construction and is supported in a slightly inclined position by rollers 61 and driven by a ring gear 62 from an electric motor 63 at a relatively low rate of rotation. The material to be melted is fed into the upper end of the kiln 60 through a water cooled chute 65 which receives the material from an elevator 66 and bin conveyor 67. The upper end of the kiln has a gas-tight seal with one side of a vertically elongated settling chamber 68 through which the chute 65 extends. The chamber 68 has a cleanout door 69 at its lower end and a side opening 70 intermediate its height opening to a stack connection 71 alongside the settling chamber. As indicated in Fig. 3, the center line of the kiln 60 is slightly offset, for example 4 inches, from the center line of the melting pot in a direction opposite to the direction of rotation of the kiln. This arrangement compensates for the angular displacement given to the discharging material and insures its deposition in approximately the center of the hearth section of the melting pot.

A substantially gas-tight connection is provided between the rotary kiln 60 and the stationary melting pot 30 by a stationary hood 75 supported on the top of the melting pot. As shown in Figs. 2 and 3, the hood is formed by a gas-tight steel casing 76 lined with high temperature firebrick 77 and a high temperature concrete 78 molded to form a burner port 79 having its axis substantially in alignment with the axis of the kiln 60. A burner casing 80 opens to the port 79 and is arranged to receive a supply of combustion air from the blower 20 through pipe 18 and a valve-controlled branch pipe 81. A burner nozzle 82 projects through the casing 80 into the port 79. The side of the hood adjacent the kiln has a substantially gas-tight rotary connection therewith partly formed by a stationary circular water cooled header 84 into which the adjacent end of the kiln, formed of high temperature fire brick, fits. The lower sector of the header 84 is lined with plastic chrome ore refractory 85. The bottom of the hood 75 is shaped to conform with the rectangular opening 57 of the melting pot. A poke hole 86 is located adjacent these communicating openings to permit an operator to remove any material tending to clog the openings.

In the operation of the apparatus described, the air preheating unit is first put into operation and the preheated air therefrom delivered to the melting pot 30 before any material to be melted is delivered thereto. As the air temperature increases, the melting pot temperature correspondingly increases. When the pot refractory walls have reached substantially a red heat, a fluid fuel such as #2 fuel oil is introduced through the burner nozzle 53 and burned in suspension in the melting chamber in the described flame path. The gaseous products of combustion or heating gases from the melting chamber pass out through the outlet 57 and through the rotary kiln 60 to the stack connection 71. The auxiliary burner 82 may be operated when desired to supplement the heating effect in the kiln of the gases from the melting pot. When the melting pot temperature has reached a predetermined value, the material to be melted, which may be either in a raw condition or calcined but preferably in small lumps or pellets, is delivered from the conveyor 67 to the elevator 66 and through the chute 65 to the upper end of the rotating kiln 60. As the material flows downwardly through the kiln towards its discharge end, it receives a substantial preliminary heat treatment which increases its temperature to a value several hundred degrees below its melting temperature. The small lumps of material discharge from the lower end of the rotary into the center area of the melting pot and are rapidly brought to a melting temperature. The melting chamber is maintained under a slight positive pressure so that some heating gases will leave through the tap hole to keep it hot; while the pot head, rotary, settling chamber and stack are maintained under suction, regulated by a damper in the stack connection. The melt outlet 40 is initially dammed until the pool of melt in the melting chamber has reached the desired proportions and temperature, whereupon the dam is broken and the material discharged over the lip 43. The material supply and melting rates are adjusted to give a continuous stream of melt discharging from the pot. The melt is then further treated as hereinafter described.

Kaolins or china clay are a highly desirable refractory raw material because of their relatively high purity, firing to a white color and availability at relatively low cost. Kaolins have a fusion temperature of about 3245° F., and one Georgia kaolin, for example, was found to have a chemical analysis of approximately

|  | Per cent |
|---|---|
| Silica | 45.30 |
| Alumina | 39.14 |
| Titanium oxide | 1.54 |
| Iron oxide | 0.27 |
| Lime | 0.13 |
| Magnesia | 0.04 |
| Potash | 0.15 |
| Soda | 0.10 |
| Ignition loss | 13.71 |

When kaolins are used as the material to be melted in the described operation, the material is supplied either in the raw state or as a sintered grog and is heated to a temperature above 2800° F. in the rotary, leaving the rotary in small lumps of ½ to 1 in. maximum dimension. With this material the melting chamber temperature will be continuously maintained in the range of approximately 3400–3500° F. In normal operation, the supplies of material to the rotary and the melting rate are proportioned to provide a substantially continuous discharge of molten kaolin over long periods depending upon the subsequent treatment to be given the melt. Laboratory attempts to melt kaolin in a graphite pot in an electrically heated induction furnace were unsuccessful because the silica ($SiO_2$) content volatilized as a fume, leaving a liver-like residue in the pot. With the oil fired melting process described however, the melted kaolin has the consistency or viscosity of thin cream.

The molten or fused kaolin and other refractory materials on discharging from the melting pot can be advantageously utilized for the manufacture of various high temperature refractory products. Molten kaolin has proved to be particularly advantageous when made into a high temperature mineral wool, such as by the use of a blow pipe 90 arranged below the melting pot in a position to discharge a high velocity stream of air or steam across the falling stream of melted kaolin to shred the melt into fibers of various lengths and deposit the fibers produced in a collecting chamber 92 as indicated. While melted kaolin when slowly cooled forms a mullite-silica glass aggregate, when very rapidly quenched in air or water it will form a transparent or translucent non-crystalline glass. The fused kaolin fibers in the chamber 92 are found to have the following chemical analysis:

|  | Per cent |
|---|---|
| $Al_2O_3$ | 45.5 |
| $SiO_2$ | 50.5 |
| $Fe_2O_3$ | 0.6 |
| $TiO_2$ | 2.1 |
| $CaO+MgO$ | 0.4 |
| $P_2O_5$ | 0.4 |

The high alumina content and extremely low alkali content are particularly advantageous in mineral wool in increasing the maximum permissible use temperature of the material particularly under corrosive conditions due to the high resistance to leaching by contacting solutions. In contrast to wools made in a cupola, the kaolin wool described is further characterized by an absence of carbon therein. The kaolin wool produced in accordance with the described method is a white fluffy fibrous material having the appearance of absorbent cotton, but somewhat more stiff and bristling.

Tests of the heat insulating properties of kaolin wool by an independent industrial laboratory showed that it was quite superior to twenty different commercial brands of fibrous insulating materials previously tested. The kaolin wool fibers were not affected by water vapor attack at high temperatures, a condition very damaging to most other fibrous insulations. The permissible use temperature was confirmed to be over 1000° F. higher than the best commercial brands of high temperature fibers available. It was found on test that a three-inch thick kaolin wool heat insulating blanket produced the same cold surface temperature (155-160° F.) with a hot surface temperature of 1000° F. as two three-inch thick blankets of "Fiberglas" insulation, "Fiberglas" being a trade name for spun or drawn fibers of glass molded into a batt.

Flexible batts of kaolin wool for high temperature service can advantageously be made by using a high temperature stainless steel wire mesh on the hot inner face of the batt joined to a cover of asbestos cloth on the cold face, with the kaolin wool packed therein at a density of approximately 10 lbs./cu. ft.

Comparative tests of Fiberglas and kaolin wool have indicated the following different properties:

| Property | Fiberglas | Kaolin Wool |
|---|---|---|
| Diameter, microns | 3-7 | 2-4 |
| Aver. Young's Modulus,[1] lbs./sq. in. | $6.64 \times 10^6$ | $12.9 \times 10^6$ |
| Flexibility coefficient [1] | $1.99 \times 10^{-2}$ | $2.39 \times 10^{-2}$ |
| Strength [1] (breaking stress, lbs./sq. in.) | 132,000 | 308,000 |
| Permeability with air vel., 300 ft./min.: | | |
| Packed at 7 lbs./cu. ft. Press. drop in. $H_2O$ | 8.25 | 19.75 |
| Packed at 10 lbs./cu. ft. Press. drop in. $H_2O$ | 15 | 28.25 |
| Permissible use, temp., ° F.: | | |
| Long time | 1,000 F | 2,000 |
| Short time | 1,200 F | 2,300 |
| Melting temp., ° F | about 1,800 | 3,180 |

[1] Tests for Young's modulus, flexibility coefficient and calculated strength followed the procedure described in an article, "The strength of glass fibers," Parts I and II, by J. B. Murgatroyd, Journal, Society of Glass Technology, December 1944.

The specific gravity of the kaolin fibers was approximately 2.62. The index of refraction was found to be between 1.550 and 1.545. Samples of the kaolin wool were reheated to various temperatures up to 3200° F. No recrystallization occurred below 2600° F. At temperatures between 2350 and 2600° F. some change in material took place as the heavier fibers became visible under crossed Nicol prisms but no recrystallization was noted. A well defined recrystallization occurred when heated to 2600° F., but the crystals were too small to identify. Melting took place when the fibers were heated to 3200° F. and large mullite crystals were present. The fibers were given bending tests and found to retain their good resiliency after heating to temperatures as high as 2400° F. for five hours. The foregoing tests indicated that the fibers were substantially pure chilled kaolin. With the described properties these fibers can be safely used for short periods (e. g. 5-6 hours) at temperatures ranging upwards to 2300° F. and very much longer periods at temperatures up to 2000° F. as thermal, sound and electrical insulation and for other purposes.

An excellent mullite wool suitable for high temperatures of the order stated for kaolin wool can also be made by the described process and apparatus. In this case a mullite composition such as the following batch:

Calcined Dutch Guiana bauxite (48 mesh) _____ lbs __ 56.7
Calcined kaolin grog (40 mesh) _____ lbs __ 32.0
Raw kaolin _____ lbs __ 20.0 was charged to the melting pot. Since the impurities in the mix can be neglected, the above proportions will produce a mullite composition with the following chemical analysis:

| | Percent |
|---|---|
| $Al_2O_3$ | 68.1 |
| $SiO_2$ | 26.5 |
| $Fe_2O_3$ | 2.1 |
| $TiO_2$ | 2.7 |

The mullite wool appeared to be slightly finer and softer than the kaolin wool.

It has also been found that the melted kaolin can be also advantageously used in the manufacture of cast fused refractories, such as glass tank blocks. For this purpose the stream of molten kaolin is directed into a mold which may be either a water cooled metal mold or a sand mold and immediately thereafter buried in a suitable heat insulating material such as Sil-o-cel (a diatomaceous earth product) either with the mold or after having been removed from the mold. Kaolin cast blocks 12" x 12" x 6" made as herein described were found to have a density of 161 lbs. per cu. ft. and a melting point of 3200° F. The chemical analysis was similar to that stated for kaolin wool.

Where it is desired to simulate cast fused refractory products of an electric furnace, a small amount, as for example, 2%, of carbon can be accurately added to the melt in the melting chamber. It has also been found that the addition of refractory oxides, such as chrome oxide, tend to increase the melting point and erosion resistance to molten glass of the resultant blocks. Glass tank tests of cast kaolin blocks and other commercial brands of cast blocks have shown that the cast kaolin blocks are far superior from an economic viewpoint than any known brands of cast refractories for this purpose. Cast blocks made from melted bauxite and also from a kyanite composition, while showing no better wearing qualities than the cast kaolin blocks, were found to have higher temperature use limits and slightly better volume stability.

The apparatus described can be also advantageously used in the manufacture of grog to be used as aggregate in molded refractory shapes. One such application is in the manufacture of kyanite grog from domestic kyanite. In contrast to Indian kyanite, for example, domestic kyanite as mined has a much greater content of impurities and must be reduced to a fineness of 25 mesh or less and then treated to eliminate the impurities. With such fineness the kyanite ore can be used in mortar, for example, but is much too fine for use as grog in the manufacture of brick. With the present apparatus, the kyanite ore can be melted in the melting pot and the melt cast into slugs which are then crushed to any desired grog size for use in the manufacture of kyanite brick or other molded shapes.

The advantage of utilizing a grog in the manufacture of molded refractory shapes, such as brick and blocks, which is made by melting, casting and then crushing a refractory material to a desired size, is illustrated in the following table of comparative test results between three sets of test specimens having the same composition except for the use of different forms of grog. Column A indicates the results obtained by test straights made by firing a mixture of rotary kiln calcined kaolin, alumina abrasive grain, and raw kaolin to a firing temperature of 3040° F. Column B indicates the test results on specimens where the grog used was melted kaolin cast and crushed in accordance with the present invention. Column C shows the test results on specimens in which a higher alumina grog, prefused, cast and crushed as described was substituted for the grogs previously described.

|  | A | | B | | C | |
|---|---|---|---|---|---|---|
| Rotary Kiln Calcined Kaolin (−4 M) _____percent__ | 70 | | | | | |
| Cast Melted Kaolin (−4 M) _____do____ | | | 70 | | | |
| Cast Melted Eufaula Bauxite (−4 M) _____do____ | | | | | 70 | |
| 94% Alumina Abrasive Grain (−60 M) _____ | 15 | | 15 | | 15 | |
| Raw Kaolin_____ | 15 | | 15 | | 15 | |
| Firing Temp., °F_____ | 3,040 | | 3,040 | | 3,040 | |
| Firing Shrinkage, percent_____ | 3.1–3.8 | | 0.3–0.4 | | | |
| Firing Expansion, percent_____ | | | | | (0–0.2) | |
|  | Per cent ΔL | Per cent ΔV | Per cent ΔL | Per cent ΔV | Per cent ΔL | Per cent ΔV |
| Cumulative Change on Reheatings at 3000°: | | | | | | |
|   1st Reheat—5 hrs _____ | −1.6 | −5.3 | +0.1 | 0 | −.05 | +.15 |
|   2nd Reheat—5 hrs _____ | −2.1 | −6.4 | +0.1 | −.5 | +.05 | +.05 |
|   3rd Reheat—5 hrs _____ | −1.8 | −4.8 | −0.2 | −1.0 | 0.0 | +.35 |
| Load Test—25 p. s. i.—1½ Hr.: | | | | | | |
|   Percent Deformation at 2,850° F_____ | 6.1 | | 2.9 | | 0.2 | |
|   Percent Linear Deformation at 2,950° F_____ | | | | | (.5–1.0) | |
| Chemical Analysis, percent by weight: | | | | | | |
|   $SiO_2$ _____ | 43.3 | | 43.5 | | 28.4 | |
|   $Al_2O_3$ _____ | 52.7 | | 53.2 | | 67.8 | |
|   $TiO_2$ _____ | 1.8 | | 1.9 | | 2.5 | |
|   $Fe_2O_3$ _____ | 1.1 | | 0.8 | | 1.3 | |
|   CaO _____ | 0.1 | | 0.1 | | 0.0 | |
|   MgO _____ | 0.5 | | 0.5 | | 0.1 | |
|   Alkali _____ | 0.3 | | 0.3 | | 0.0 | |

The above test data shows that the test specimens with the prefused grogs had substantially better linear and volumetric stability, as well as increased hot load strength over the specimens using grog made in the usual manner. From these results the products of the type shown in columns B and C would be recommended for higher use temperature limits than those in column A.

Further tests were made by firing test specimens of the composition shown in column C to a firing temperature of 3100° F. The increased firing rate resulted in a harder structure which showed zero deformation with the load tests described, a firing expansion of zero to 0.1%, and substantially no change on reheating to the test temperatures, permitting a still higher use temperature limit than the specimens covered by column C.

This application is a division of our prior application Ser. No. 684,686, filed July 19, 1946.

While in accordance with the provisions of the statutes we have illustrated and described herein the best form of the invention now known to us, those skilled in the art will understand that changes may be made in the form of the apparatus disclosed without departing from the spirit of the invention covered by our claims, and that certain features of our invention may sometimes be used to advantage without a corresponding use of other features.

We claim:

1. Apparatus for the melting of high fusion temperature materials comprising a melting furnace lined with high fusion temperature refractory material and having a tap hole in the lower portion and a gas outlet in the upper portion of said furnace, means for burning a combustible mixture of fuel and air in suspension in said furnace, means for supplying combustion air at high temperatures to said furnace comprising a heat transfer unit having an upper chamber and a lower chamber connected thereto, a continuous fluent gas-pervious mass of refractory heat transfer material in said chambers, means for maintaining a cyclic flow of said heat transfer material through said chambers, means for heating said heat transfer material in said upper chamber, and means for passing combustion air in heat transfer relation with the heat transfer material in said lower chamber, a rotary kiln arranged to receive gaseous products of combustion from said melting furnace gas outlet and to deliver material to be melted therethrough, and means for supplying material to be melted to said rotary kiln and moving the same therethrough in heat transfer relation with the gaseous products of combustion therein.

2. Apparatus for the melting of high fusion temperature materials comprising a melting furnace lined with high fusion temperature refractory material and having a tap hole in the lower portion and a gas outlet in the upper portion of said furnace, means for burning a combustible mixture of fuel and air in suspension in said furnace, means for supplying combustion air at high temperatures to said furnace comprising a heat transfer unit having an upper chamber and a lower chamber connected thereto, a continuous fluent gas-pervious mass of refractory heat transfer material in said chambers, means for maintaining a substantially continuous cyclic flow of said heat transfer material through said chambers, means for heating said heat transfer material in said upper chamber, and means for continuously passing combustion air in heat transfer relation with the heat transfer material in said lower chamber, a rotary kiln arranged to receive gaseous products of combustion from said melting furnace gas outlet and to deliver material to be melted therethrough, and means for continuously supplying material to be melted to said rotary kiln and moving the same therethrough in heat transfer relation with the gaseous products of combustion therein.

3. Apparatus for the melting of high fusion temperature materials comprising a melting furnace having a gas outlet in the upper portion of said furnace, means for burning a combustible mixture of fuel and air in suspension in said furnace, means for supplying combustion air at high temperatures to said furnace comprising a heat transfer unit having an upper chamber and a lower chamber connected thereto, a continuous fluent gas-pervious mass of refractory heat transfer material in said chambers, means for maintaining a cyclic flow of said heat transfer material through said chambers, means for heating said heat transfer material in said upper chamber, and means for passing combustion air in heat transfer relation with the heat transfer material in said lower chamber, a rotary kiln arranged to receive gaseous products of combustion from said melting furnace gas outlet and to deliver material to be melted therethrough, and means for supplying material to be melted to said rotary kiln and moving the same therethrough in heat transfer relation with the gaseous products of combustion therein.

4. Apparatus for the melting of high fusion temperature materials comprising a melting furnace lined with high fusion temperature refractory material and having a tap hole in the lower portion of said furnace, means for burning a combustible mixture of fuel and air in suspension in said furnace, means for supplying combustion air at high temperatures to said furnace comprising a heat transfer unit having an upper chamber and a lower chamber connected thereto, a continuous fluent gas-pervious mass of refractory heat transfer material in said chambers, means for maintaining a cyclic flow of said heat transfer material through said chambers, means for heating said heat transfer material in said upper chamber, and means for passing combustion air in heat transfer relation with the heat transfer material in said lower chamber, and means for supplying material to be melted to said melting furnace.

5. Apparatus for the melting of high fusion temperature materials comprising a melting furnace lined with high fusion temperature refractory material and having a tap hole in the lower portion of said furnace, means for burning a combustible mixture of fuel and air in suspension, in said furnace, means for supplying combustion air at high temperatures to said furnace comprising a heat transfer unit having an upper chamber and a lower chamber connected thereto, a continuous fluent gas-pervious mass of refractory heat transfer material in said chambers, means for maintaining a substantially continuous cyclic flow of said heat transfer material through said chambers, means for heating said heat transfer material in said upper chamber, and means for continuously passing combustion air in heat transfer relation with the heat transfer material in said lower chamber, and means for continuously supplying material to be melted to said melting furnace.

6. A melting furnace unit comprising walls formed of high temperature refractory material defining a furnace chamber of substantially horizontal circular cross-section having a gas outlet in its top and a bottom constructed to retain a pool of molten material, a tap hole located in one side of said chamber adjacent the bottom level, a fluid fuel burner port at side of said chamber opposite said tap hole and offset from the center line thereof, a fluid fuel burner in said port arranged to discharge a fuel stream sweeping over said bottom and substantially tangentially within said chamber, a rotary kiln arranged to discharge material to be melted through said gas outlet and to receive heating gases therefrom, said rotary kiln being arranged with its center line offset from the vertical center line of said furnace in a direction opposite to the direction of rotation of said rotary kiln, and said gas outlet being elongated in a direction transversely of the center line of said kiln.

7. Apparatus for the melting of high fusion temperature materials comprising a melting furnace lined with high fusion temperature refractory material and having a tap hole in the lower portion and an opening in the upper portion of said furnace, means for maintaining a high temperature in said furnace comprising means for generating high temperature heating gases therein, a rotary kiln having an end opening arranged to deliver material to be melted through said furnace opening and to receive heating gases therethrough, said rotary kiln being arranged with its center line offset from the vertical center line of said furnace in a direction opposite to the direction of rotation of said rotary kiln, fuel burning means for supplying high temperature gaseous products of combustion to said rotary kiln, and means for continuously supplying material to be melted to said rotary kiln and moving the same therethrough in heat transfer relation with the gaseous products of combustion therein.

ISAAC HARTER.
CHARLES L. NORTON, Jr.

References Cited in the file of this patent

UNITED STATES PATENTS

| Number | Name | Date |
| --- | --- | --- |
| 296,586 | Levette | Apr. 8, 1884 |
| 332,894 | Hambleton | Dec. 22, 1885 |
| 2,447,306 | Bailey et al. | Aug. 17, 1948 |
| 2,500,553 | Lykken | Mar. 14, 1950 |